Sept. 4, 1956 P. C. BOREL ET AL 2,761,902

AUTOMATIC TELEPHONE EXCHANGE

Filed June 14, 1950 10 Sheets-Sheet 1

Inventors
PIERRE C. BOREL
MARCEL R. MAUGE

By Robert Harding
Attorney

Inventors
PIERRE C. BOREL
MARCEL R. MAUGE
By Robert Harding Jr.
Attorney

Sept. 4, 1956 P. C. BOREL ET AL 2,761,902
AUTOMATIC TELEPHONE EXCHANGE
Filed June 14, 1950 10 Sheets-Sheet 3

Inventors
PIERRE C. BOREL
MARCEL R. MAUGE
By Robert Harding Jr.
Attorney

Inventors
PIERRE C. BOREL
MARCEL R. MAUGE
By Robert Harding Jr.
Attorney

Sept. 4, 1956 P. C. BOREL ET AL 2,761,902

AUTOMATIC TELEPHONE EXCHANGE

Filed June 14, 1950 10 Sheets-Sheet 5

Inventors
PIERRE C. BOREL
MARCEL R. MAUGE

By Robert Harding Jr.
Attorney

AUTOMATIC TELEPHONE EXCHANGE

Filed June 14, 1950

10 Sheets-Sheet 6

Inventors
PIERRE C. BOREL
MARCEL R. MAUGE
By Robert Harding Jr
Attorney

Inventors
PIERRE C. BOREL
MARCEL R. MAUGE
By Robert Harding Jr.
Attorney

AUTOMATIC TELEPHONE EXCHANGE

Filed June 14, 1950 10 Sheets-Sheet 8

Inventors
PIERRE C. BOREL
MARCEL R. MAUGE
By Robert Harding Jr.
Attorney

AUTOMATIC TELEPHONE EXCHANGE

Inventors
PIERRE C. BOREL
MARCEL R. MAUGE
By Robert Harding Jr.
Attorney

Sept. 4, 1956 P. C. BOREL ET AL 2,761,902

AUTOMATIC TELEPHONE EXCHANGE

Filed June 14, 1950 10 Sheets-Sheet 10

Inventors
PIERRE C. BOREL
MARCEL R. MAUGE

By Robert Harding Jr.
Attorney 2,761,902
Patented Sept. 4, 1956

2,761,902

AUTOMATIC TELEPHONE EXCHANGE

Pierre Charles Borel and Marcel Roger Mauge, Boulogne-Billancourt, France, assignors to International Standard Electric Corporation, New York, N. Y., a corporation of Delaware Application June 14, 1950, Serial No. 168,052

Claims priority, application France June 27, 1949

8 Claims. (Cl. 179—18)

The present invention relates to improvements in automatic switching systems such as those used in automatic telephone systems.

In automatic telephone systems, switching devices such as selector switches, generally scan successively two rows of terminals placed in parallel relation to each other. In some of these systems there is always a brush in contact with the terminals of each one of the rows, and a switching system is provided for successively connecting to the test equipment the brushes scanning the two rows of terminals. When a call initiates the starting of a selector-switch hunting operation, it may happen that the brush carrier must travel over the whole of a row of terminals before exploring the second row where the calling terminal is located. This same situation occurs when the selection is made under the control of a register. It becomes readily apparent that to cause the brush carriage to travel over rows of terminals on which there is no chance of finding either a calling line or a junction of the desired level results in a considerable loss in switching speed. The result is a loss of time in the establishment of the connection and a premature wear of the equipment.

One of the objects of the present invention is to provide an automatic telephone system in which the hunting for a calling line is effected simultaneously on the parallel rows of terminals constituting the bank of terminals of the line finder.

Another object of the present invention is to provide an automatic telephone system in which the register circuit controlling the selections determines for each selector which it controls the row of the bank of terminals on which the desired level is to be found.

The above-mentioned and other features and objects of this invention and the manner of attaining them will become more apparent and the invention itself will be best understood by reference to the following description of an embodiment of the invention taken in conjunction with the accompanying drawings wherein.

In the following description all potentials are measured with reference to ground potential, and as it is well known in the art, the positive terminal of the 48 volts battery of the central exchange is connected to ground.

Figure 2:
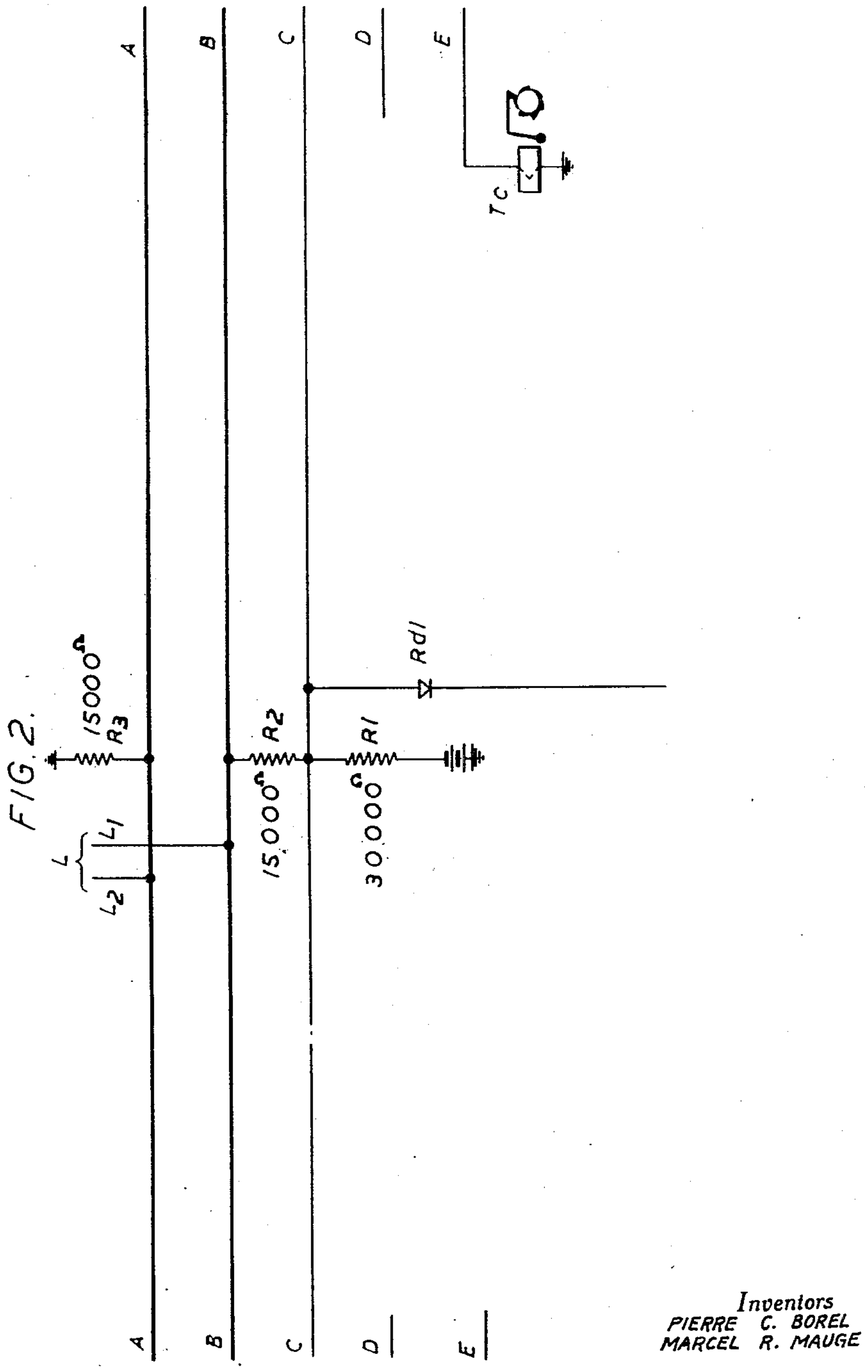
Fig. 2 represents a line circuit.
Figure 3:
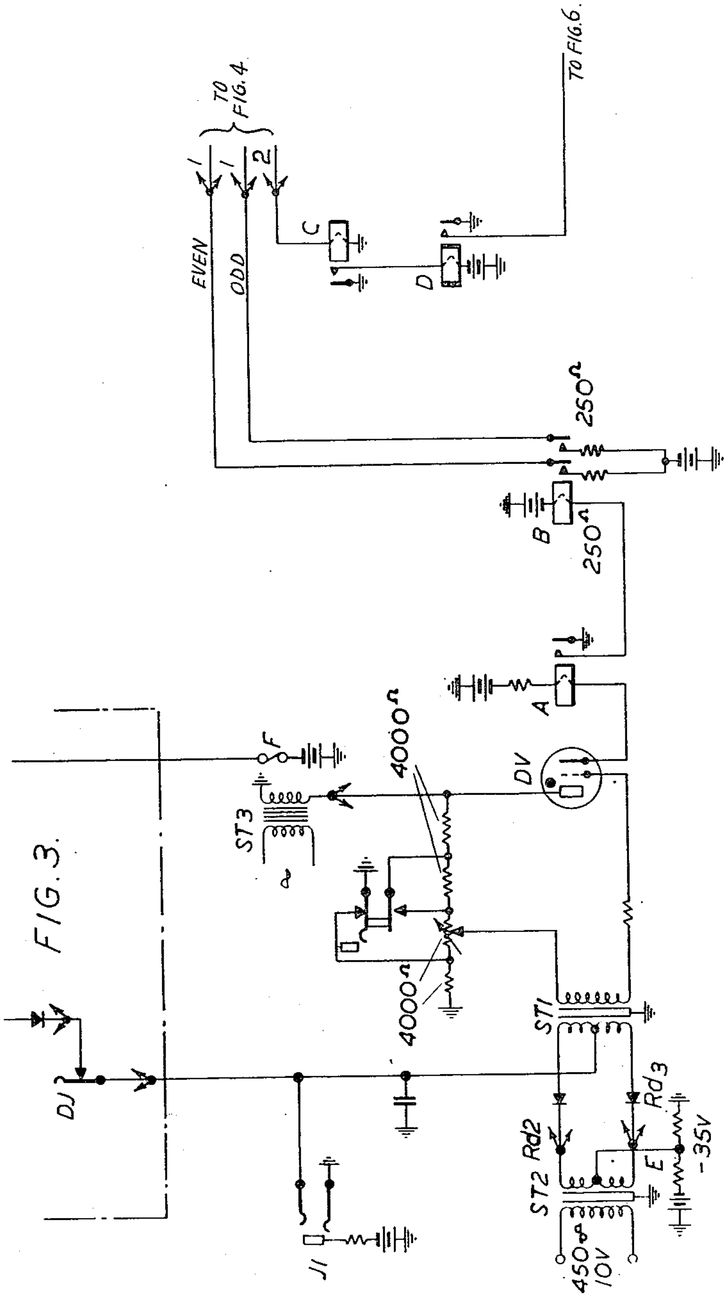
Fig. 3 represents a starting circuit.

Referring to Fig. 2, the operation is such that when line L is calling, the wires of this line are looped and a current flows in the following circuit: battery, resistance $R_1$ of 30,000 ohms, resistance $R_2$ of 15,000 ohms, line wire $L_1$, subscriber's station (not shown), line wire $L_2$, resistance $R_3$ of 15,000 ohms and ground. Potential of wire C which was —48 volts is raised to about —24 volts. This potential variation on wire C causes the ionisation of the cold-cathode tube DV (Fig. 3). During the absence of any such circulation current the rectifiers R*d*2 and R*d*3 are opposed to the flow of alternating current of 450 cycles per second which flows through the primary winding of transformer ST2. When the potential of wire C is raised to about —24 volts, as described above, a current flows between this wire and point E (Fig. 3) (kept at —35 volts) through the rectifiers R*d*1, R*d*2 and R*d*3. Rectifiers R*d*2 and R*d*3 are then rendered conductive and current flows through the two primary windings of transformer ST1. A potential difference appears at the terminals of the secondary winding of this transformer and the cold-cathode tube DV ionises. A current flows from the cathode to the anode causing the operation of relay A which in turn closes the energisation circuit of relay B. Relay B, on operating, connects the negative terminal of a 48-volt battery to wire 1 of the even or odd line finder circuit through a 250-ohm resistance. For each one of the circuits of free line finders the following circuit is then established: battery, 250-ohm resistance, wire 1 (Fig. 3), busying device $CO_1$, break contact 1 of relay A (Fig. 4), wire *t*, break contact 1 of relay M*c* (Fig. 5), resistance R, wire $t_1$ (Fig. 4), wire 2 (Figs. 4 and 3), winding of relay C and ground. Relay C energises and by its make contact closes the energisation circuit of relay D (Fig. 3). Relay D on operating, closes the energization circuit of the starting relay C*a* (Fig. 6) of link circuits for the group corresponding to the cord circuit likely to be associated with the calling line. Relay C*a* closes the following circuit for the free link circuits: battery, clutch electro-magnet CCE, make contact of relay C*a*, busying device CO2, break contact 1 of relay T*c*, break contact 1 of relay A*b*, and ground. The clutch electro-magnet CCE energises and controls the hunting for a cord circuit by the finder CC. When the brushes of finder CC reach the terminals connected to a free cord circuit in the group of cord circuits corresponding to the calling line, relay T*c* (Fig. 6) energises by the following circuit: ground, busying device CO3, left-hand winding of relay T*c*, brush and terminal T of finder CC, wire *t* (Fig. 5), break contact 1 of relay M*c*, wire *t* towards Fig. 4, break contact 1 of relay A in Figure 4, busying device CO1, wire 1 (Fig. 3), make contact of relay B, resistance about 250 ohms and battery. Relay T*c* (Fig. 6) by opening its break contact 1 opens the energisation circuit of the clutch electro-magnet CCE of finder CC which stops. By its make contact 2, relay T*c* introduces the winding of relay T*a* and its own right-hand winding in parallel with its left-hand winding. The winding of relay T*a* as well as the right-hand winding of relay T*c* are of low resistance in order to prevent a further operation of relay T*c* in another link circuit (double test). Relay T*a* by its make contact 2, closes the circuit of the clutch electro-magnet CEE of finder CE which controls the displacement of the brushes of this finder along the bank of terminals which are connected to the register circuits. Wire "*t*" of the register circuits has potentials characterising the state of availability of these circuits connected to it. This potential characterising the availability of the register circuits is obtained by connecting terminal *t* to the negative terminal of a 48-volt battery through a 250-ohm resistance. When the register circuit is busy, this battery may be disconnected or the potential of terminal *t* may be modified by the current traversing the 250-ohm resistance and the test circuit. Details of these circuits, which are well known in the art, have not been represented.

When the finder CE meets a free circuit, relay *Te* operates by the following circuit: ground, make contact 1 of relay *Ta*, right-hand winding of relay *Te*, brush T and terminal *t* of finder CE, to which is applied the potential of availability. As has been previously described for the operation of relay *Tc*, relay *Te*, on operating, introduces the winding of relay *Tb* and its left-hand winding in parallel with its right-hand winding, thus modifying the potential of brush T in order to prevent the seizure of the register circuit by another line circuit. Further the relay *Te* by its operation opens the circuit of the electro-magnet CEE, thus stopping the hunting of finder CE. Relay *Tb*, on operating, closes the energisation circuit of relay $B_2$ which, on operating, connects to the register circuit the various circuits necessary for the hunting of the calling line.

The clutch electro-magnet CLE of the line finder CL is connected to wire *b* and thence towards the register by means of the following circuit: battery, clutch electro-magnet CLE (Fig. 4), break contact 2 of relay A, wire *b* (Fig. 5), wire *b* (Fig. 6), terminal and brush B of finder CC, make contact 3 of relay $B_2$, brush and terminal B of finder CE, and wire *b* towards the register.

The test brush $C_1$ of finder CL is connected to wire $a_1$ (Fig. 6) towards the register by means of the following circuit: brush $C_1$ of finder CL (Fig. 4), break contact 1 of relay C, wire $c_1$, break contact 2 of relay *Mc* (Fig. 5), wire $a_1$ towards the link circuit, terminal and brush A1 of finder CC (Fig. 6), make contact 7 of relay $B_2$, brush and terminal $A_1$ of finder CE, wire $a_1$ towards the register.

The test brush $C_2$ of finder CL is connected to wire $d_1$ (Fig. 6) by means of the following circuit: brush $C_2$ of the finder CL (Fig. 4), wire $c_2$, break contact 4 of relay *Cm* (Fig. 5), wire $d_1$, brush and terminal $D_1$ of the finder CC (Fig. 6), make contact 5 of relay $B_2$, brush and terminal $D_1$ of finder CE, wire $d_1$ towards the register.

Relay C (Fig. 4) is connected to wire *a* of the register by means of the following circuit: ground, winding of relay C (Fig. 4), break contact 3 of relay A, wire *a* (Fig. 4), wire *a* (Fig. 5), terminal and brush A of finder CC (Fig. 6), make contact 4 of relay $B_2$, brush and terminal A of finder CE, wire *a* towards the register.

Relay A (Fig. 4) is connected to wire $b_1$ of the register by means of the following circuit: ground, winding of relay A (Fig. 4), wire *f*, break contact 3 of relay *Mc* (Fig. 5), wire $b_1$, terminal and brush $B_1$ of finder CC (Fig. 6), make contact 6 of relay $B_2$, brush and terminal $B_1$ of finder CE, wire $b_1$ towards the register.

Figures 2, 4, 5, 6, 9:
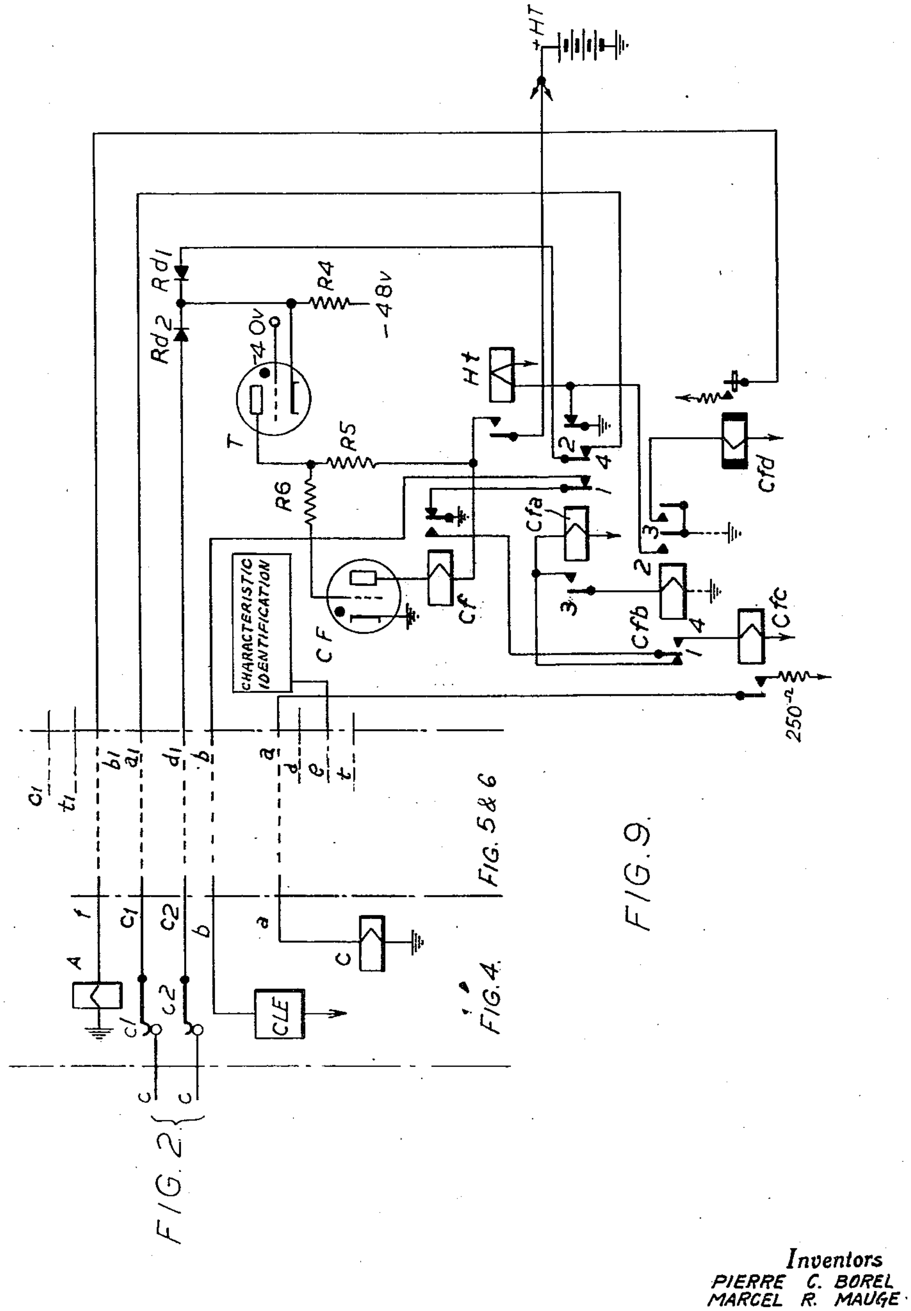
Fig. 9 represents the condition of the register circuit during the hunting for a calling line.

Turning now to Fig. 9 which represents the portion of the register used for hunting for the calling line, it will be seen that the winding of the clutch electro-magnet CLE is connected to ground by means of break contact 1 of relay *Cfa* and the break contact of relay *Cf*. The clutch electro-magnet CLE controls the displacement of brushes of finder CL on the corresponding bank of terminals. Both brushes $C_1$ and $C_2$ of this finder scan the different terminals to which are connected wires C of the line circuits. These two brushes are connected, respectively, through rectifying cells $Rd_1$ and $Rd_2$, to the negative terminal of a 48-volt battery through resistance $R_4$ and to the cathode of the triode T. The grid of triode T is connected to the negative terminal of a 40-volt battery. The plate of the triode is connected to the positive terminal of a high-tension battery HT by means of resistance $R_5$ and the make contact of relay *Ht*, and to the control electrode of the cold-cathode tube CF through resistance $R_6$. The energisation circuit of relay *Ht* is closed by the break contact 2 of relay *Cfa*. The cathode of the cold-cathode tube CF is connected to ground, whereas its anode is connected to the make contact of relay *Ht* through the winding of relay *Cf*.

When the triode T is conductive, a current flows through resistance $R_5$ and the potential applied to the control electrode of tube CF is too low to cause the ionisation of this tube. The grid of the triode remains positive with respect to the cathode as long as none of the brushes C of the line finder CL (Fig. 4) is connected to wire C of a calling line. This results from the fact that when a brush C of the finder CL is either between two terminals or on one of the terminals connected to a line which is not calling the potential of the cathode of the triode T is −48 volts.

Figure 4:
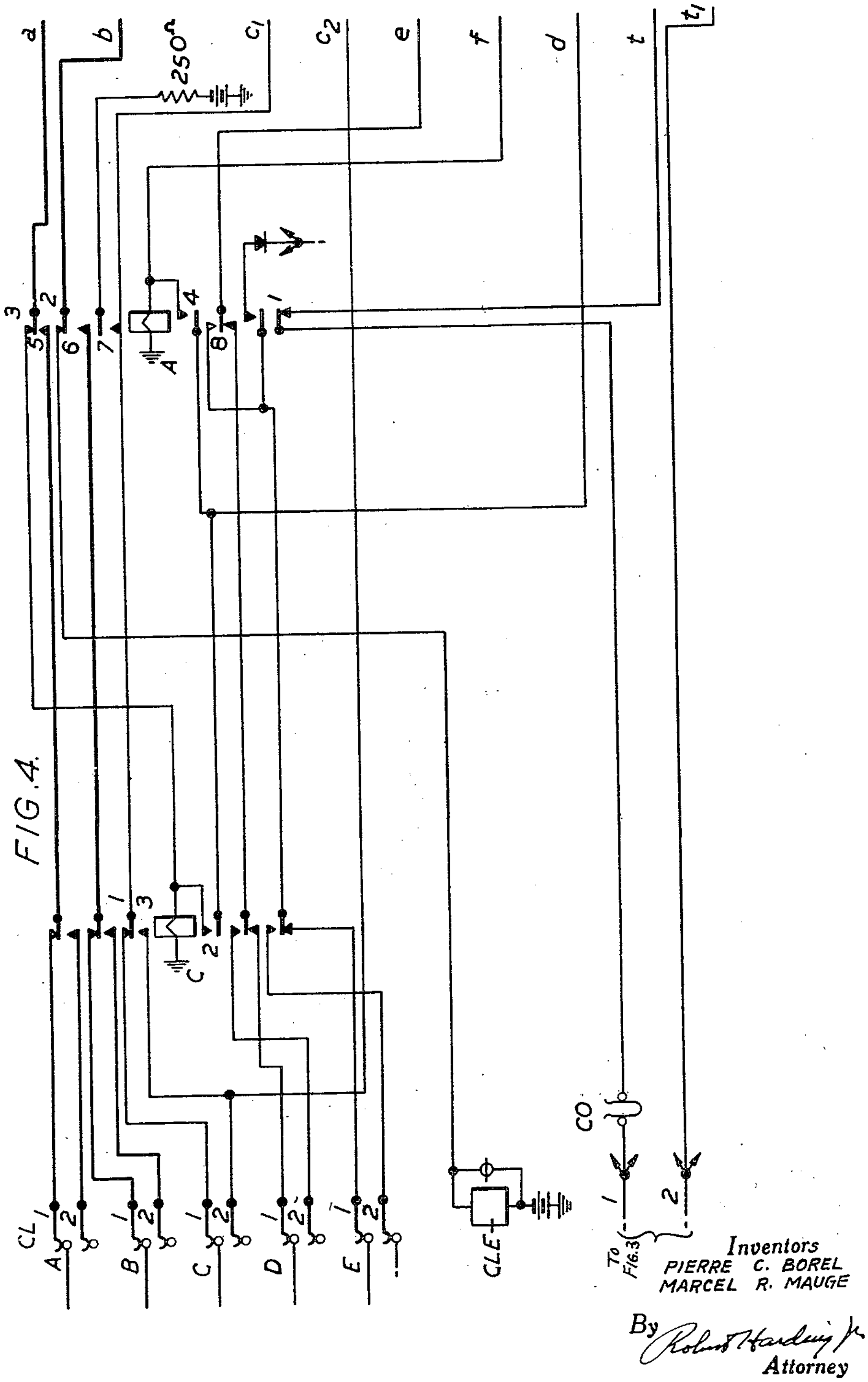
Fig. 4 represents a circuit for a line finder.

When the brush C of finder CL is connected to wire C of a busy line, this wire is connected to the negative terminal of a 48-volt battery through a 250-ohm resistance. The potential of wire C is still −48 volts: in the three cases the triode remains conductive. However, when one of the brushes $C_1$ or $C_2$ is connected to wire C of a calling line, which is at a potential of −24 volts a current flows through resistance $R_4$ through one of the rectifiers $Rd_1$ or $Rd_2$ and the cathode potential becomes positive with respect to that of the grid and the triode ceases to be conductive. The control electrode of the cold-cathode tube CF is then brought to a high potential, due to the suppression of the anode current in the resistance $R_5$. The cold-cathode tube ionises and a current is established through the principal anode and the cathode causing the operation of relay *Cf* in series in the anode circuit. Relay *Cf* on operation opens the energisation circuit of the starting electro-magnet CLE which stops the line finder CL (Fig. 4). Relay *Cf*, by its make contact, closes the energisation circuit of relay *Cfa*: battery, winding of relay *Cfa*, break contact 1 of relay *Cfb*, make contact of relay *Cf*, ground. Relay *Cfa*, by opening its break contact 2, opens the energisation circuit of relay *Ht* which, by opening its make contact, disconnects battery. The cold-cathode tube CF de-ionizes and relay *Cf* releases. After the de-energisation of relay *Cf*, relay *Cfb* energises through the following circuit: ground, winding of relay *Cfb*, make contact 3 of relay *Cfa*, winding of relay *Cfa*, and battery. By opening its break contact 4, relay *Cfa* disconnects brush $C_1$ of the finder CL (Fig. 4) from the rectifying cell $Rd_1$. Relay *Cfb* by its make contact 2 closes the energisation circuit of relay *Ht* which again connects battery by its make contact to the circuits of the triode T and of the cold-cathode tube CF.

If the calling line is connected to the lower part of the bank of terminals of the line finder CL, i. e. to terminal $C_2$, the current continues to flow through resistance $R_4$ and the ionisation of tube CF takes place again. If, on the contrary, the calling line is connected to the upper part of the bank of terminals of finder CL, i. e. to terminal $C_1$, relay *Cfa* by opening its break contact 4 suppresses the current from resistance $R_1$ (Fig. 2) and the triode remains conductive. It will therefore be seen that relay *Cf* operates only if the calling line is connected to the lower part of the bank of terminals.

If relay *Cf* operates again, relay *Cfc* (Fig. 9) energises by the following circuit: battery, winding of relay *Cfc*, make contact 4 of relay *Cfb*, make contact of relay *Cf*, ground. Relay *Cfc* closes the energization circuit of relay C (Fig. 4). If relay *Cf* remains at rest, relay *Cfc* does not operate and relay C (Fig. 4) remains at rest and the connection takes place over the upper part of the bank of terminals. In the opposite case the connection takes place over the other part of the bank of terminals.

Relay *Cfb*, by its make contact 3, closes the energisation circuit of relay *Cfd*, which, by its make contact, in turn causes the energisation of relay A (Fig. 4). Relay *Cfd* is slow to operate in order to leave sufficient time, if necessary, for relay C to effect the switching of the brushes. After the operation of relay A (Fig. 4), the energisation circuit of relay C is opened, but the relay remains locked by its make contact 2 and by the make contact 4 of relay A.

Relay A, on operating, by its contacts 5 and 6, extends the wires A and B of the calling line, and by its contact 7 it connects the negative terminal of a 48-volt battery through a 250-ohm resistance to wire C of the calling line, in order to apply to wire C a potential characterising the busy condition of the line. By its change-over contact 8 it connects the wire *e* of the calling line (call-meter TC) to the link circuit.

Before the operation of relay A wire D of the calling line was connected to the register in order that the latter could identify the characteristics of the line.

Figure 5:
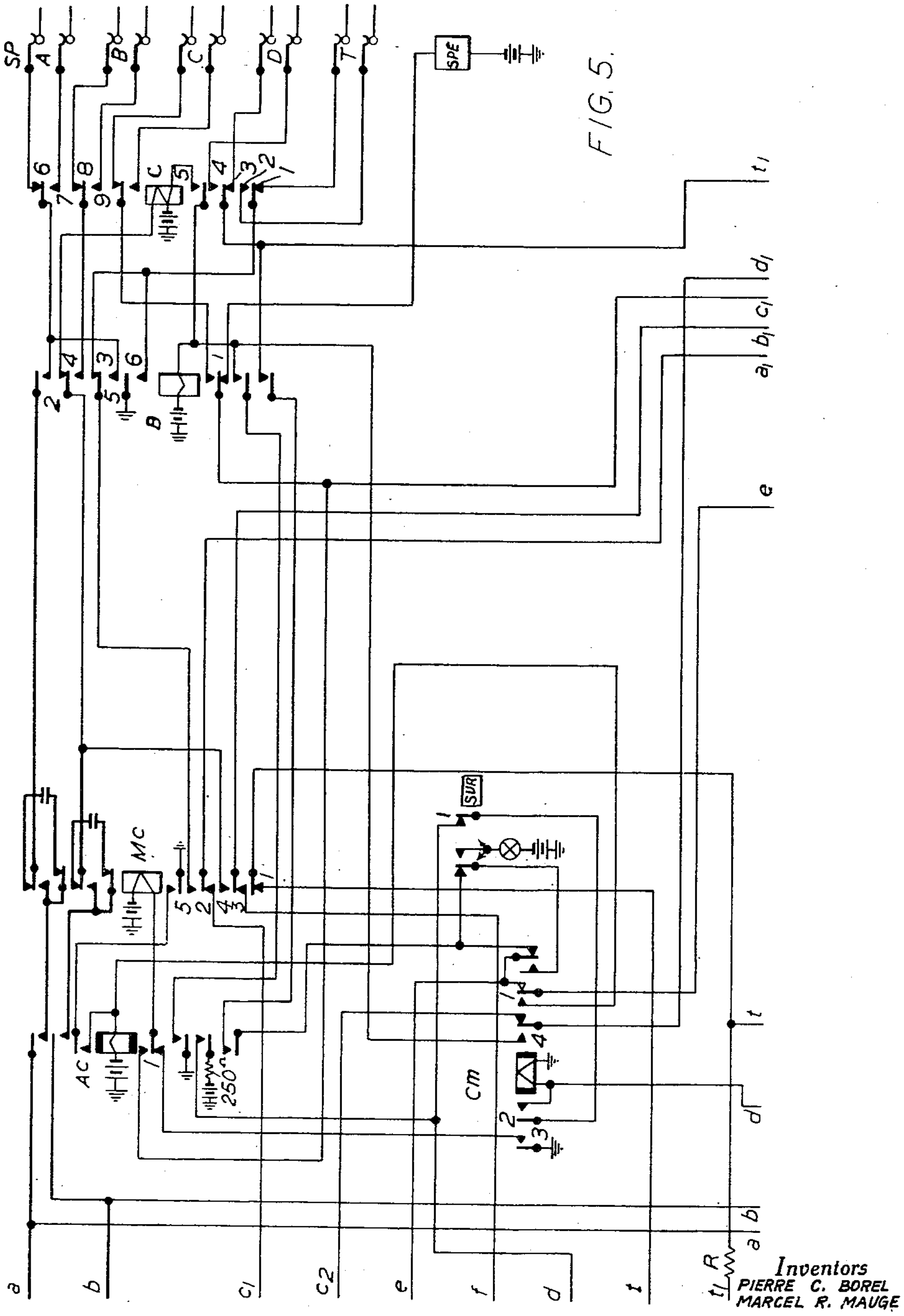
Fig. 5 represents a cord circuit.
Figures 5, 6, 7, 10:
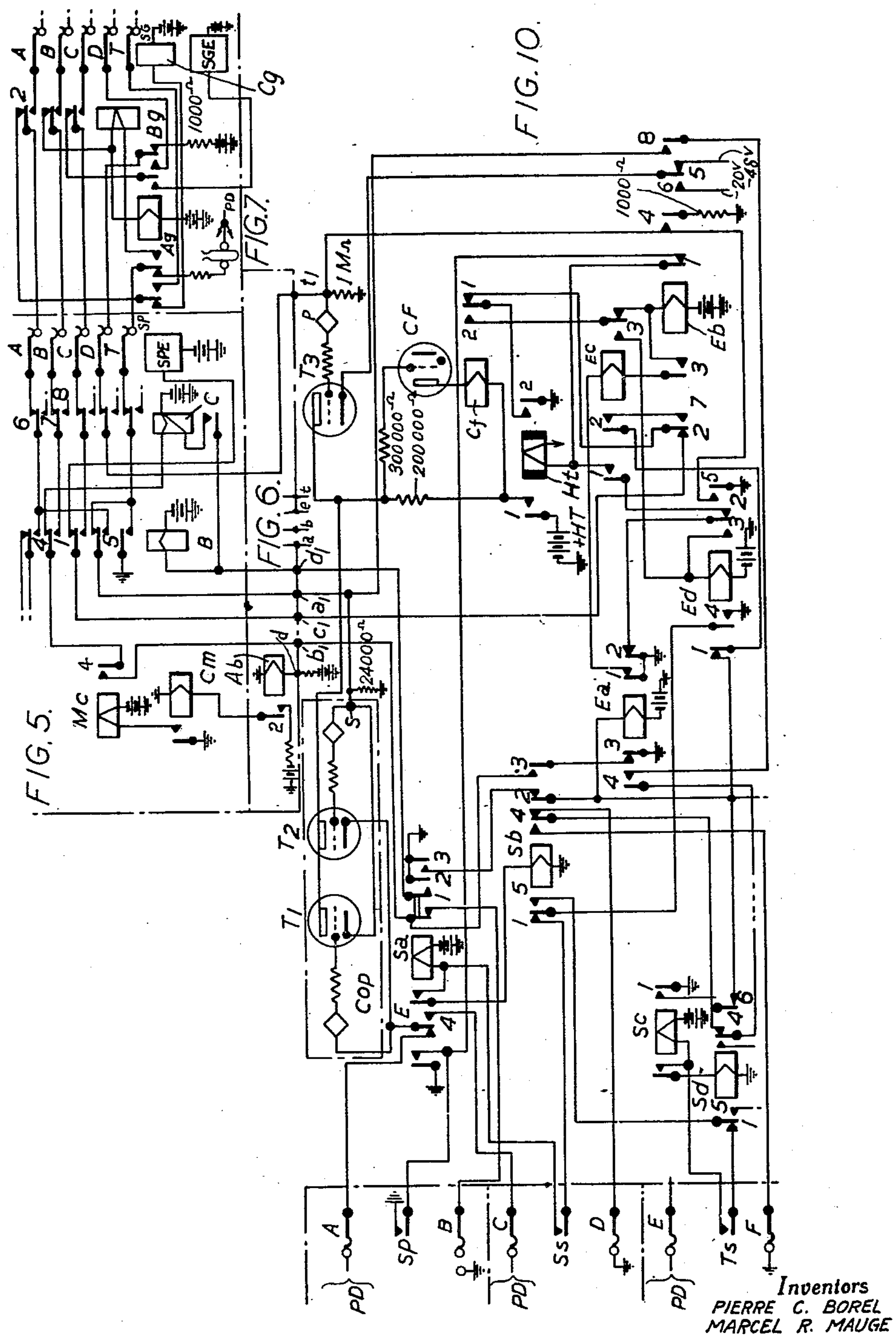
Fig. 10 represents the condition of the register circuit during the control of the different selections.

As is well known wires A and B of the calling line are connected to impulse relays. Relay A*b* (Fig. 6) is operated by the following circuit: ground, winding of relay A*b*, make contact 2 of relay $B_2$, brush and terminal D of finder C*e*, wire *d*, 3,000-ohm resistance and battery (Fig. 10). Relay A*b* (Fig. 6) closes, by its make contact 2, the energisation circuit of relay C*m* (Fig. 5): ground, winding of relay C*m*, wire *d*, terminal and brush D of finder CC, make contact 2 of relay A*b*, 250-ohm resistance and battery. Relay C*m* (Fig. 5), by its make contact 2, closes the locking circuit for relays A and C (Fig. 4) by the following circuit: battery, on wire *d* of the link circuit, make contact 2 of relay C*m*, break contact 1 of relay S*ur*, wire *d*, make contact 4 of relay A (Fig. 4) and make contact 2 of relay C (Fig. 4), windings of relays A and C, respectively, and in parallel therewith, ground.

Figure 6:
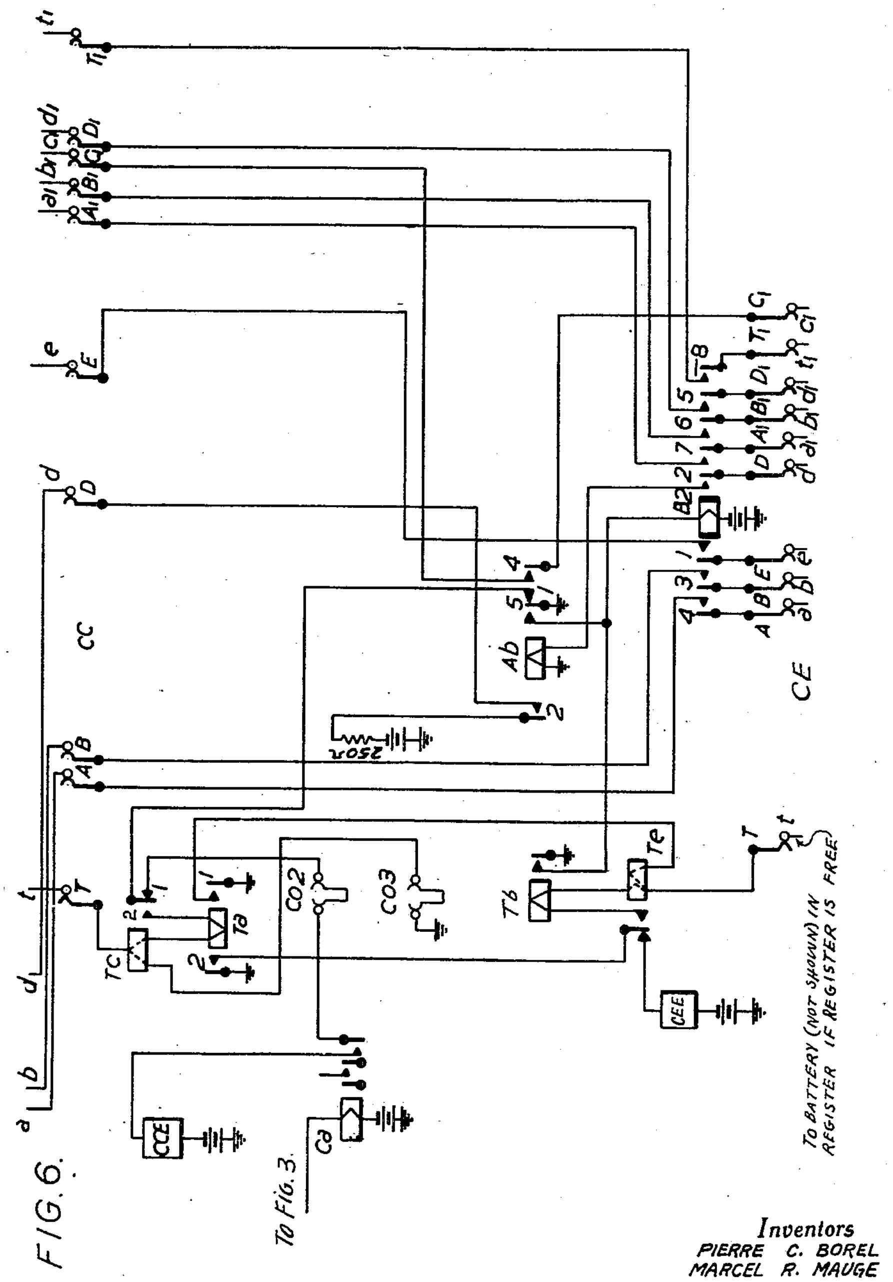
Fig. 6 represents a link circuit.

Relay M*c* (Fig. 5) is energised by the following circuit: battery, winding of relay M*c*, break contact 1 of relay A*c*, make contact 3 of relay C*m* and ground. The circuit is then placed under the control of the register which connects a battery to wire *d*. Relay A*b* is energised (Fig. 6) and by its make contact 5, closes a holding circuit for relay $B_2$ and by its make contact 2 it closes the circuit of relay C*m* (Fig. 5). Relay A (Fig. 4) and relays M*c* and C*m* (Fig. 5) open the test wires, thus avoiding the seizure of the link circuit by another cord circuit. The necessary equipment for the primary selection is now connected to the register.

The clutch electro-magnet SPE (Fig. 5) for the primary selector SP is connected to the register by means of the following circuit: battery, winding of clutch electro-magnet SPE (Fig. 5), break contact 1 of relay B, wire $c_1$ towards the link circuit, terminal and brush $C_1$ of finder CC (Fig. 6), make contact 4 of relay A*b*, brush and terminal $C_1$ of finder C*e*, wire $c_1$ towards the register.

Relay C (Fig. 5), which connects the lower part or the upper part of selector SP, is connected over the following circuit to the register circuit: battery, upper winding of relay C, break contact 2 of relay B, make contact 4 of relay M*c*, wire $b_1$, terminal and brush $B_1$ of finder CC (Fig. 6), make contact 6 of relay $B_2$, brush and terminal $B_1$ of finder CE, wire $b_1$ towards the register.

The test brush T of the level considered is connected to the register by the following circuit: brush T of selector SP, break contact 1 or make contact 2 of relay C, break contact 3 of relay B, make contact 2 of relay M*c*, wire $a_1$ towards the link circuit, terminal and brush $A_1$ of finder CC (Fig. 6), make contact 7 of relay $B_2$, wire $a_1$ towards the register.

The test brush D for determining the availability is connected by the register to the following circuit: brush D of selector SP, break contact 3 or make contact 4 of relay C, wire $t_1$ towards the link circuit, terminal and brush $T_1$ of finder CC (Fig. 6), make contact 8 of relay $B_2$, brush and terminal $T_1$ of finder CE, wire $t_1$ towards the register.

Referring to Fig. 10 it will be appreciated that the called number is registered by means well known in the art and that when the digits so registered effect the control of the first selection, contact S*p* (shown on the left hand side of Fig. 10) is closed. A device such as a translator (if the digits have to be translated before controlling the selections) or a step-by-step selector such as the selector for receiving the first digit is provided in the register. The latter includes two brushes A and B. Brush A is connected to a potential PD indicating the level of the first selection. Brush B is connected to a terminal which may be either connected to ground, if the desired level is on the lower part of the set of brushes of the primary selector, or not connected at all, if the wanted level is on the upper part of the bank of terminals of the primary selector.

The means for characterizing the terminals with the potential desired by brush A are well known and have not been described. When a ground is connected to brush B it causes the operation of relay C (Fig. 5) by means of the following circuit: ground, brush B, break contact 1 of relay S*a*, wire $b_1$, terminal and brush $B_1$ of the finder CE (Fig. 6), make contact 6 of relay $B_2$, terminal and brush $D_1$ of finder CC (Fig. 6), wire $b_1$, make contact 4 of relay M*c*, break contact 4 of relay B, upper winding of relay C (Fig. 5) and battery. Relay C on operating connects the wires $a_1$ and $t_1$ of the register to the brushes T and D, respectively, of the lower part of the bank of terminals of selector SP. When the contact S*p*, Fig. 10, is closed, it causes the energisation of relay H*t* (Fig. 10) by the following circuit: ground on contact S*p*, break contact 1 of relay E*b*, winding of relay H*t* and battery. Relay H*t* by its make contact 1 connects the positive terminal of a high-potential battery HT through a 200,000-ohm resistance to the anodes of the triodes $T_1$, $T_2$ and $T_3$, and through the winding of relay C*f* to the anode of the cold-cathode tube CF. By its make contact 2, relay H*t* energises the clutch electro-magnet SPE (Fig. 5) of the primary selector over the following circuit: ground, make contact 2 of relay H*t*, break contact 1 of relay C*f*, break contact 2 of relay E*b*, wire $c_1$, brush and terminal $C_1$ of finder CE (Fig. 6), make contact 4 of relay A*b*, brush and terminal $C_1$ of finder CC, wire $c_1$, break contact 1 of relay B, clutch electro-magnet SPE, and battery. The electro-magnet SPE causes the displacement of the various brushes of the primary selector SP. When the brushes of the primary selector SP meet the terminals connected to a free circuit of the desired level, the two triodes $T_1$ and $T_2$ of the voltage-comparing device cease to remain conductive, the two potentials applied thereto being the same. The triode $T_3$ also ceases to be conductive, the grid potential and the cathode potential being the same (−48 volts) and the elements of the voltage biasing device P insuring a grid voltage variation sufficient in order that the triode ceases to be conductive under such conditions. When the triodes $T_1$, $T_2$ and $T_3$ cease to be conductive, the cold cathode tube CF ionises and the anodic current flowing through the winding of relay C*f* causes the energisation of this relay. Relay C*f*, through the opening of its make contact 1, opens the energisation circuit of the clutch electro-magnet SPE which stops the hunting of the primary selector SP.

Figure 7:
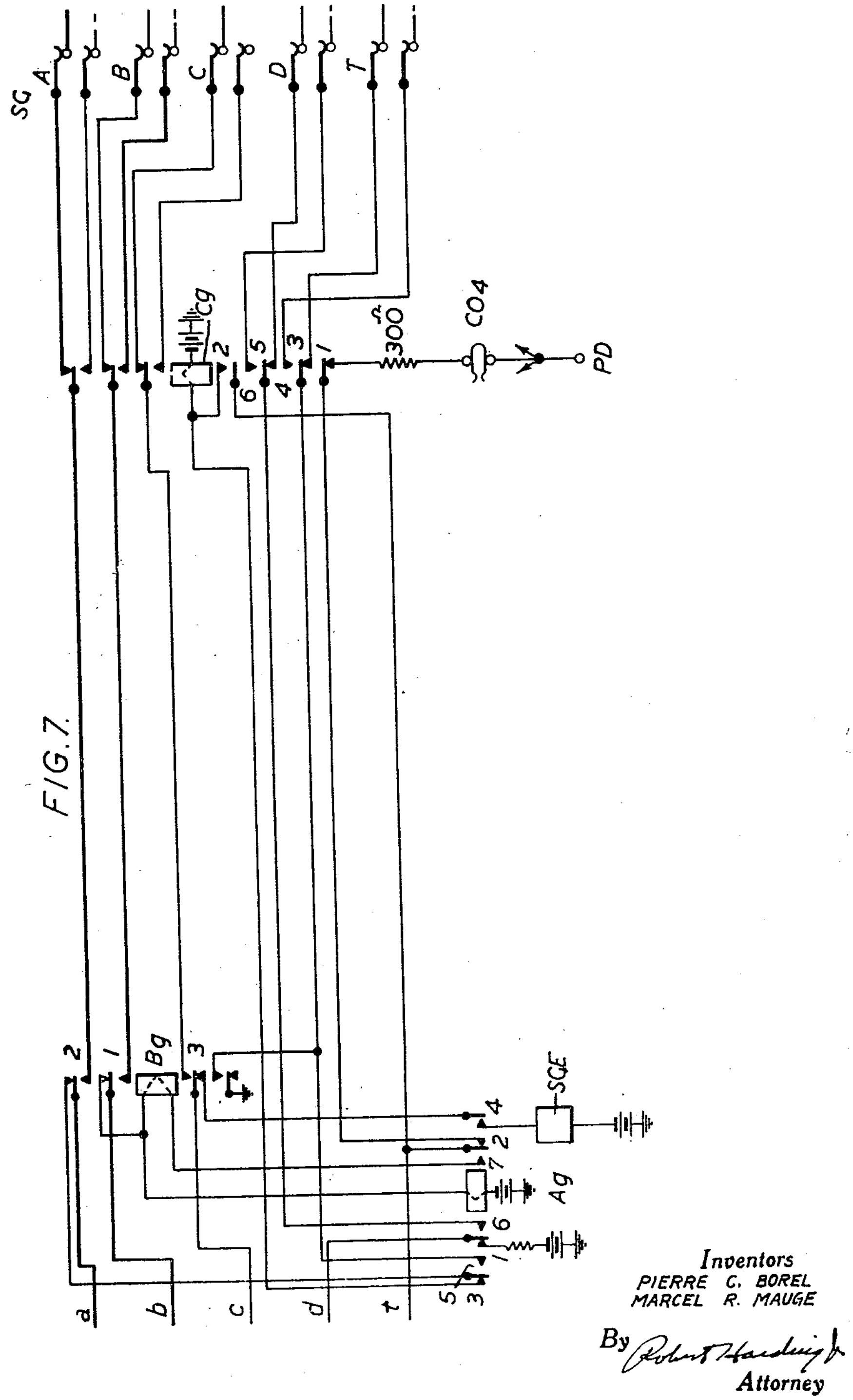
Fig. 7 represents a circuit for a group selector.

The circuit reached is a group selector circuit, such as the one represented in Fig. 7. When such a circuit is free, relays A*g*, B*g* and C*g* are at rest and the availability and level characteristics are applied respectively on wires *d* and *t* by means of the following circuits: for wire *d*: wire *d*, break contact 1 of relay A*g*, negative terminal of a 48-volt battery; for wire *t*: wire *t*, break contact 2 of relay A*g*, break contact 1 of relay C*g*, 300-ohm resistance, busying device $CO_4$, level characteristic potential connected to terminal PD.

Referring to Fig. 10 it will be understood that, since the plates of the three triodes are connected in parallel, the cold-cathode tube CF is not allowed to energise and the hunting for the primary selector SP can only be stopped when the three triodes are blocked, i. e. when a free desired-level circuit has been met. When only one of the conditions is met, i. e. if the selector meets an occupied circuit of the desired level, or a free circuit of a different level, the selector continues to hunt, both verifications being made simultaneously.

Referring to Fig. 10, it will be seen that relay C*f* which, by opening its make contact 1, caused the primary selector SP to stop, by its make contact 2 closes the energisation circuit of relay E*b*. Relay E*b*, by opening its break contact 1, opens the circuit of relay H*t* which releases and disconnects the high-potential battery. Relay C*f*, the winding of which is in series in the anode circuit of cold-cathode tube C*f*, releases, relay E*c* operates then by means of the following circuit: ground, break contact 1 of relay E*a*, winding of relay E*c*, make contact 3 of relay E*b*, winding of relay E*b*, and battery. This circuit operates as a locking circuit for relay E*b*. Relay E*c*, by its make contact 1, again closes the energisation circuit of relay H*t*: ground, break contact 2 of relay E*a*, break contact 2 of relay E*c*, make contact 1 of relay E*d*, winding of relay H*t*, and ground. A new test is thus made to determine whether another selector has engaged the group selector circuit. For this purpose, the 1-megohm resistance placed in series on wire $t_1$ (Fig. 10) falls to 1,000 ohms through make contact 4 of relay E*b*. The potential of the cathode of triode $T_3$ passes from −48 volts to −20 volts by means of contacts 5 and 6 of relay E*b*.

It will be seen that after the operation of relay E*b* a current flows through the two 1,000-ohm resistances placed in series in the following circuit: battery, 1,000-ohm resistance, break contact 1 of relay A*g* (Fig. 7), terminal and brush D, break or make contact of relay C (Fig. 5), wire $t_1$, terminal and brush $T_1$ of finder CC (Fig. 6), make contact 8 of relay $B_2$, brush $T_1$ and terminal of register finder CE, make contact 4 of relay E*b* (Fig. 10), 1,000 ohm resistance and ground. If the connection is a simple one, the potential applied to grid $T_3$ is −24 volts, while if the connection is a double one the grid potential of triode $T_3$ is −16 volts. The grid then becomes negative with respect to the cathode if the connection is a simple one, while it becomes positive with respect to the cathode if the connection is a double one. The triode ceases to be conductive in the case of a simple connection and the potential-comparing device composed of triodes $T_1$ and $T_3$ permits the operation of relay C*f*. In the case of a double connection, the energisation circuit of relay E*a* is closed: battery, winding of relay E*a*, break contact 1 of relay E*d*, make contact 2 of relay E*c*, make contact 7 of relay E*b*, break contact 1 of relay C*f*, make contact 2 of relay H*t* and ground. Relay E*a* by its break contact 1 opens the circuit of relays E*b* and E*c*, this operation putting the circuit in its initial state and causing a new hunting process.

In the case of a simple connection, relay C*f* on operating closes the energisation circuit of relay E*d*: battery, winding of relay E*d*, make contact 3 of relay E*c*, make contact 2 of relay C*f*, make contact 2 of relay H*t*, and ground. Relay E*d* through its make contact 3 is locked by means of the ground to break contact 2 of relay E*a*, and by opening its contact 2 it opens the circuit of relay H*t* which, in releasing, disconnects the high-potential battery HT so as to suppress the output of cold-cathode tube CF. The circuit seized remains engaged by connecting its wire *d* to ground by make contact 4 of relay E*b*, through a 1,000-ohm resistance.

The circuit remains in the above-mentioned state until the second selection is effected. This is done either when the translator is ready to control the following selection or when the second digit is registered, resulting in closure of contact S*s* (Fig. 10). Relay S*a* energises through the following circuit: battery, winding of relay S*a*, contact S*s* operated, break contact 1 of relay S*b*, make contact 4 of relay E*d* and ground. Relay S*a* by its make contact 2 closes the energisation circuit of relay B (Fig. 5): battery, winding of relay B, make contact 4 of relay C*m*, wire $d_1$, terminal and brush $D_1$ of finder CC (Fig. 6), make contact 5 of relay $B_2$, brush and terminal $D_1$ of finder CE, wire $d_1$, make contact 2 of relay S*a* (Fig. 10) and ground. Relay S*a*, by opening its break contact 1, opens the energisation circuit of relay C (Fig. 5). If this relay is energised it remains locked in parallel with the energisation circuit of relay B (Fig. 5) by means of its make contact 5. Relay S*a*, by its make contact 3, closes the energisation circuit of relay E*a*: ground, make contact 3 of relay S*a*, break contact 2 of relay S*b*, winding of relay E*a*, and battery. Relay E*a*, by opening of its contacts 1 and 2, opens the locking circuit of relays E*b*, E*c* and E*d* which release. When relay E*d* opens its make contact 4, relay S*a* remains locked in series with relay S*b* which energises. Relay S*b*, through its break contact 2, opens the circuit of relay E*a*.

After releasing of relay E*a*, ground is connected on wire $b_1$ through break contact 3 of relay E*a* and make contact 3 of relay S*b*. Ground is connected to wire *b* of Figure 7 through the following circuit: wire *b* (Fig. 7), terminal and brush B of primary selector SP, break contact 8 or make contact 9 of relay C, make contact 4 of relay B, make contact 4 of relay M*c*, wire $b_1$, terminal and brush $B_1$ of finder CC (Fig. 6), make contact 6 of relay $B_2$ (Fig. 6), brush and terminal $B_1$ of finder CE, wire $b_1$ (Fig. 10), make contact 3 of relay S*b*, break contact 3 of relay E*a* and ground. Relay A*g* (Fig. 7) operates through the following circuit: battery, winding of relay A*g*, break contact 1 of relay B*g*, and ground on wire *b*.

Before operation of relay A*g* (Fig. 7), relay C*g* (Fig. 7) may be energised if the brush D of the circuit corresponding to the second selection is connected to ground. The energisation circuit of relay C*g* (Fig. 7) is the following: battery, winding of relay C*g*, break contact 3 of relay A*g*, break contact 2 of relay B*g*, wire *a*, terminal and brush A of selector SP (Fig. 5), break contact 6 or make contact 7 of relay C, make contact 5 of relay B (Fig. 5), make contact 2 of relay M*c*, wire $a_1$, terminal and brush $A_1$ of finder CC (Fig. 6), make contact 7 of relay $B_2$, terminal and brush $A_1$ of finder CE, wire $a_1$ (Fig. 10), make contact 8 of relay E*b*, make contact 4 of relay E*a*, break contact 4 of relay S*d*, break contact 4 of relay S*b*, brush D and ground. Between break contact 4 of relay S*d* and make contact 4 of relay E*a*, there have been represented in dotted lines on Fig. 10 all break contacts 4 of control relays for other selections.

If relay C*g* operates, it is locked by its make contact 2 on the ground connected on wire *t* through break contact 1 of relay C (Fig. 5) and make contact 6 of relay B (Fig. 5). After operation of relay A*g* (Fig. 7) the different circuits used for controlling the succeeding selection are connected to the register.

Clutch electro-magnet SGE (Fig. 7) of group selector SG is connected to wire *c* by means of the following circuit: battery, clutch electro-magnet SGE, make contact 4 of relay A*g*, break contact 3 of relay B*g* and wire *c*.

The test brush of the level T (Fig. 7) is connected to wire *a* through the following circuit: brush T, break contact 3 or make contact 4 of relay C*g*, make contact 5 of relay A*g*, break contact 2 of relay B*g* and wire *a*.

The availability test brush D (Fig. 7) is connected to wire *d* by means of the following circuit: brush D, break contact 5 or make contact 6 of relay C*g*, make contact 6 of relay A*g* and wire *d*.

Referring to Fig. 10 it will be seen that wires *c*, *a*, *d* (Fig. 7) are connected to wires $c_1$, $a_1$ and $t_1$ of the register. A ground is connected on wire $c_1$ which is controlled by break contact 1 of relay C*f*. Wire $a_1$ is connected to the output S of the potential-comparing device. Wire $t_1$ is connected to ground through a 1-megohm resistance and to the grid of triode $T_3$ through biasing element P. Input E of the potential-comparing device is connected to brush C of the translator by make contact 4 of relay S*a*. Brush C is connected to a characteristic potential PD corresponding to the desired level. The clutch electro-magnet SGE of group selector SG (Fig. 7) drives the different brushes of group selector SG. When these brushes meet a desired level available circuit, the triodes cease to be conductive, relay C*f* operates and clutch electro-magnet SGE stops the hunting of group selector SG. The double-test verification is provided by relays E*b*, E*c*, E*d* in the same manner as those double tests previously described.

When the register is free to start the third selection control, contact Ts (Fig. 10) is closed and relay Sc operates by means of the following circuit: battery, winding of relay Sc, make contact Ts, break contact 1 of relay Sd, make contact 5 of relay Sb, make contact 4 of relay Ed and ground. Relay Ea then operates by means of the following circuit: winding of relay Ea, break contact 6 of relay Sd, make contact 1 of relay Sc, and ground. Relay Ea by its break contact 3 disconnects the ground from wire $b_1$. The short-circuit is removed from relay Bg of Fig. 7 and it operates over the following circuit: battery, winding of relay Ag, winding of relay Bg, make contact 7 of relay Ag, wire *t*, terminal and brush T of selector SP, break contact 1 or make contact 2 of relay C (Fig. 5) and ground, on make contact 6 of relay B (Fig. 5). When relay Ea releases after the operation of relay Sd, wire $b_1$ is again connected to ground by contact 3 of relay Ea. Relay Ag of the group selector which has just been engaged operates as above described. Relay Ea on operating provides for the release of relays Eb, Ec and Ed as well as the unpriming of cold cathode tube CF by releasing of relay Ht.

It is clear that triodes $T_1$, $T_2$, and $T_3$ and their circuit, as well as relays Ea, Eb, Ec and Ht are used for controlling the various selections. Two relays are provided in the register to ascertain the end of each one of the selections; relays Sa and Sb energise after the first selection, relays Sc and Sd after the second and so on. The operation for each group selector is the same as that which has just been described.

Figure 8:
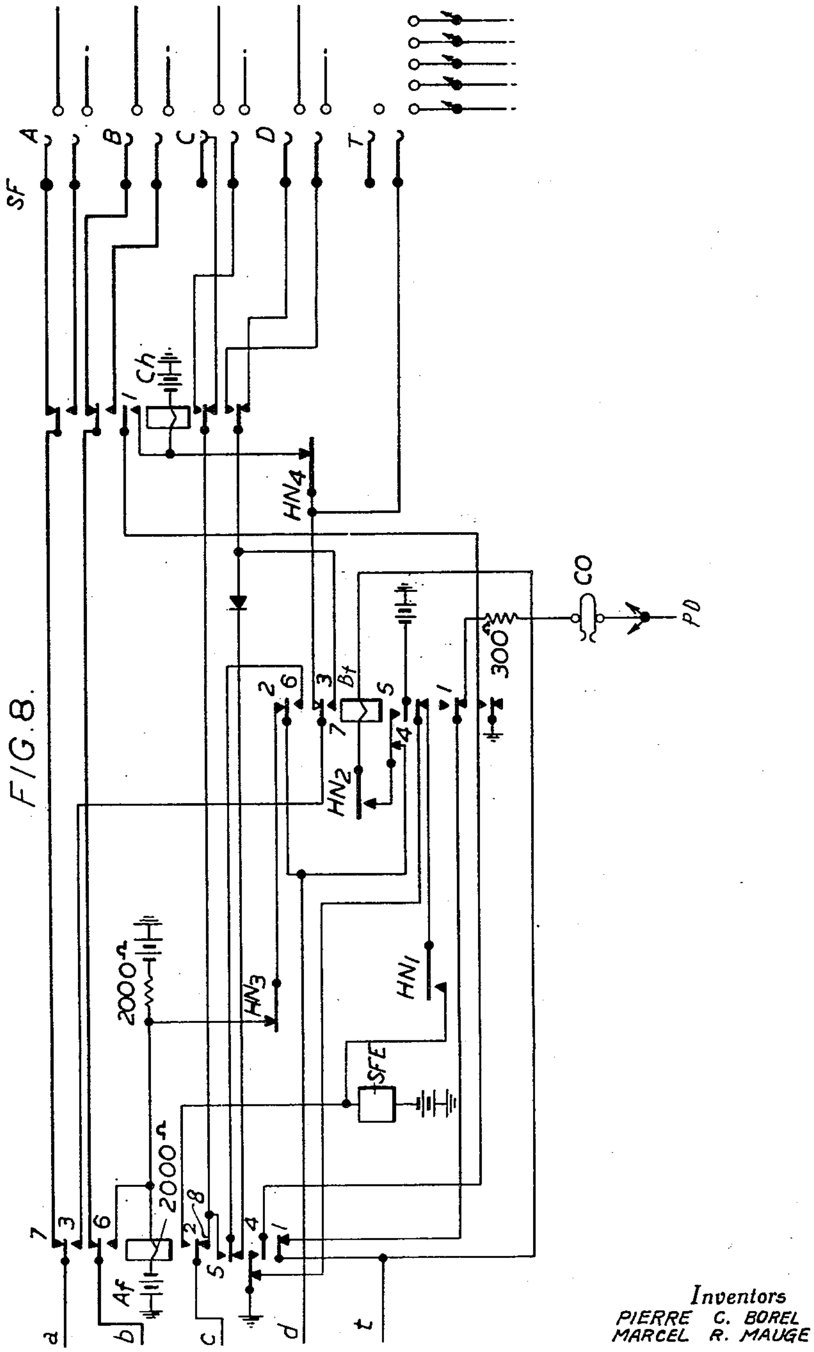
Fig. 8 represents a circuit for a final selector.

After selecting the hundreds unit, the register is connected through different group selectors to a final selector, such as the one represented in Fig. 8. Referring to this figure, it will be understood that when the circuit is available, it presents an electric characteristic of level on wire *t* by means of the following circuit: wire *t*, break contact 1 of relay Af, break contact 1 of relay Bf, 300-ohm resistance, busying device CO, and terminal PD; terminal PD is connected to a characteristic potential source by means which have not been shown. On the other hand, the final selector circuit presents on wire *d* an electric characteristic of availability: wire *d*, break contact 2 of relay Bf, break contact $HN_3$, 2,000-ohm resistance, and battery. Contact $HN_3$ is part of a series of contacts which are mechanically driven when the brushes of final selector SF are in normal position. The winding of relay Af is connected in parallel with the 2,000-ohm resistance and relay Af operates when relay Ed of Fig. 10 connects a ground on wire $t_1$ by its make contact 5. Relay Af of Figure 8 on operating prepares the different circuits used to cause the final selector to reach the proper position.

The clutch electro-magnet SFE (Fig. 8) is connected to wire *c* by means of the following circuit: battery, clutch electromagnet SFE, make contact 2 of relay Af and wire *c*.

Test brush T is connected to wire *a* by means of the following circuit: brush T, break contact 3 of relay Bf, make contact 3 of relay Af, and wire *a*.

Relay Ch controlling the selection of the lower part or the upper part of the bank of brushes of the final selector SF is connected to wire *a* by means of the following circuit, battery, winding of relay Ch, break contact $HN_4$, break contact 3 of relay Bf, make contact 3 of relay Af and wire *a*.

Relay Ch is controlled by the register which momentarily places a ground on wire $a_1$ if the ten digit is even. When relay Ch operates, this relay is locked through its make contact 1 and make contact 4 of relay Af. The advancement of the brushes of the final selector SF is controlled by the clutch electro-magnet SFE, itself controlled by the register by means of the potential-comparing device comprising triodes $T_1$ and $T_2$ (Fig. 10). Triode $T_3$ is no longer required in the selection, as there is no need to test for availability. Brush T of selector SF scans terminals carrying different potentials characterizing respective subscribers' designations. When the potential encountered corresponds to the potential of the required ten, the potentials applied on terminals E and S of comparing device (Fig. 10) are the same and relay Cf operates, thus stopping the hunting of the final selector. By means well known the potential applied at input E of the comparing device is now modified to characterize the potential corresponding to the units digit. The same relays are used as were used for above selections. The stepping of the final selector is again started until a potential is encountered by brush T which corresponds to the wanted units digit.

Figures 1, 11:
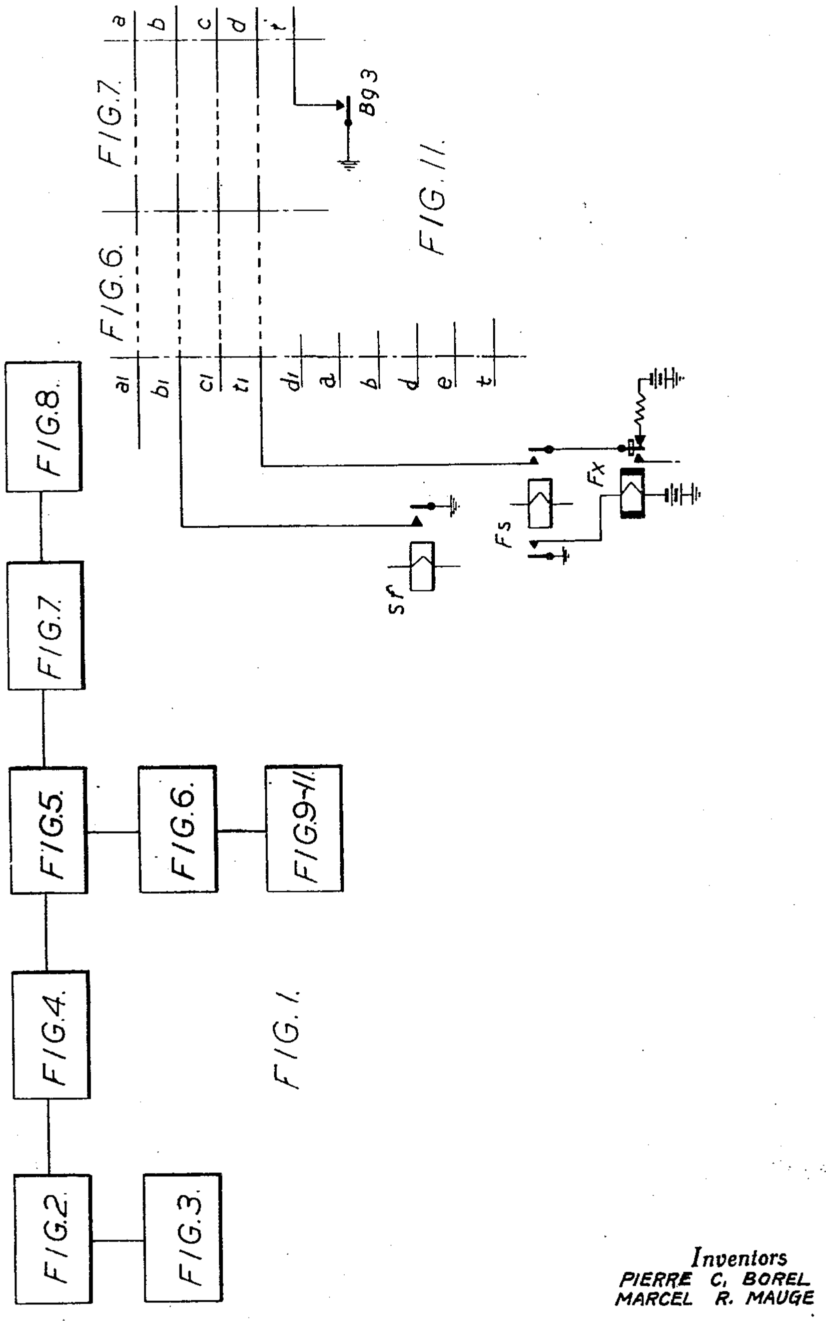
Fig. 1 represents the way in which the various drawings should be assembled for the description of a preferred embodiment of the invention.
Fig. 11 represents a detail of a circuit necessary for the control of a final selector.

Referring to Fig. 11 it will be seen that before the final selector starts hunting, relay Sf, which is energised, connects a ground on wire $b_1$, so as to ensure the holding of relay Af (Fig. 7). At the end of the stepping of the final selector, relay Fs (Fig. 11) is energised and connects a battery to wire $t_1$. During the operation of relay Fx (slow to operate), wire $t_1$ of the register (Fig. 11) is connected to wire *d* of final selector SF (Fig. 8) and the battery causes the operation of relay Bf (Fig. 8) by means of the following circuit: battery, wire *d*, break contact 4 of relay Bf, make contact $HN_2$, winding of relay Bf, and wire *t* connected to ground through contact 3 of relay Bg of the preceding group selector. The relay Bf, on energising, is locked through its make contact 5. Wire $t_1$ of the register is then connected to wire C of the called line by means of the following circuit: wire $t_1$ connected to wire *d* of Fig. 8, make contact 6 of relay Bf, and make contact 5 of relay Af. Through its make contact 7 relay Bf connects wire $a_1$ of the register to wire D of the called line. As is well known in the art, wire C of the called line carries the electric characteristic of availability while wire D carries the characteristic of the class of the line. The register then may either complete the connection or control a new stepping of the final selector to hunt for a free line amongst a set of grouped lines (P. B. X. hunting). At the end of the selection or of the P. B. X. hunting, the register disconnects ground from wire $b_1$ and relay Af (Fig. 8) releases, giving access to wires A and B of the called line through its break contacts 6 and 7, and to wire C of this line through its break contact 8. The called line is thus connected to the connection circuit which now functions, by well known means which have not been described, to connect the called line to the calling subscriber.

Referring to Fig. 5, it will be understood that there have only been illustrated those portions of the equipment which are necessary for an understanding of the present invention.

While the present invention has been described in connection with particular embodiments, it is clear that it is not limited to the said embodiments, and that there may be added modifications and changes without departing from the scope of the invention.

What is claimed:

1. An automatic telecommunication exchange system comprising a plurality of incoming lines, a plurality of outgoing lines, each of said lines including a test conductor and at least one talking conductor, a plurality of first terminals arranged in sets, said sets being connected respectively to the conductors of said incoming lines, a plurality of second terminals arranged in sets, said sets being connected respectively to the conductors of said outgoing lines, each of said sets of terminals including a test terminal and at least one talking terminal connected respectively to the test and talking conductors of the associated line, said sets of first and second terminals being divided into groups, a plurality of first wipers arranged in sets, there being one set for each group of first terminals and each set including a test wiper and talking wipers adapted successively to wipe over the corresponding first terminals of the associated group of first terminals when said first wipers are moved, a plurality of second wipers arranged in sets, there being one set for each group of second terminals and each set including a test wiper and talking wipers adapted successively to wipe over corresponding second terminals of the associated group of second terminals when said second wipers are moved, a connecting circuit including a test conductor and talking conductors corresponding to the test and talking conductors of said first terminals and normally connected to the corresponding wipers of one set of first wipers, first relay means adapted selectively to connect the conductors of said connecting circuit with corresponding wipers of other of said sets of first wipers, second relay means adapted selectively to connect the conductors of said connecting circuit with corresponding wipers of said sets of second wipers, first drive means common to all of said first wipers for simultaneously effecting movement of said sets of first wipers successively over the associated groups of first terminals, second drive means common to all said second wipers for simultaneously effecting movement of said sets of second wipers successively over the associated groups of second terminals, means connected to each of said incoming lines for applying a first predetermined potential to the test conductor of a calling line, first stop means connected to the test conductor of said connecting circuit and to the test wipers normally not connected to said connecting circuit and responsive to said predetermined potential for stopping said first drive means with said sets of first wipers engaging sets of first terminals when one of said engaged first test terminals is at said predetermined potential, discriminator means including part of said stop means and connected to a first test wiper not normally connected to the connecting circuit and responsive to said predetermined potential for operating said first relay means to connect said connecting circuit to the set of wipers including said last-mentioned test wiper, a register connected to said connecting circuit, means in said register responsive to the registration of a called number in said register for selectively applying or not applying a second predetermined potential to said talking conductor of said connecting circuit, said second relay means being so connected to said talking conductor of said connecting circuit as to be operated when said second predetermined potential appears thereon, voltage comparing means in said register having two inputs and an output and adapted to produce a signal in said output when the voltages applied to said inputs have a predetermined relation to each other, means for selectively applying one of a number of predetermined different third potentials to one of said inputs, means in said register for operating said second drive means for moving said second wipers over said second terminals, means for applying a different one of said third potentials to said second input as said second wipers move over each set of second terminals, and second stop means connected to the output of said voltage comparing circuit and controlled by a signal in said output for stopping said second drive means.

2. A system, according to claim 1, wherein said first stop means comprises a plurality of branch circuits having a common junction, one of said branch circuits being connected to the connecting circuit and the others to the first test wipers which are not normally connected to said connecting circuit, and test means connected to said junction for determining the presence of the first predetermined potential, and wherein the discriminator means comprises switch means responsive to the operation of said first stop means for opening said one branch circuit, and means responsive to the operation of said test means after said switch means has operated for operating the first relay means.

3. A system according to claim 1, wherein each of said lines and said connecting circuit comprises a second talking conductor and said system further includes an additional selector switch comprising a plurality of additional wipers, additional relay means adapted selectively to connect a selected outgoing line to different ones of said additional wipers, and additional signal-responsive means in said register for applying a characteristic D.-C. potential to said second talking conductor of said connecting circuit, said additional relay means being so connected to said selected outgoing line as to be selectively operable by means of the last-mentioned potential.

4. An automatic telecommunication exchange system comprising a plurality of incoming lines, each having a test conductor and a pair of talking conductors, a line-finder switch comprising a plurality of sets of terminals in which said lines terminate, there being a test terminal and a pair of talking terminals in each set connected respectively to the corresponding conductors of a particular line, said sets of terminals being arranged in groups, a plurality of sets of line-finder wipers, there being one set for each group of terminals and each set of wipers having a test wiper and a pair of talking wipers arranged to wipe over corresponding terminals in the associated group of terminals when said wipers are moved, and driving means for simultaneously moving said sets of wipers, stop means for stopping said driving means, responsive to an electrical characteristic and comprising a plurality of branch circuits having a common junction, there being one branch circuit for each of said test wipers, and said branch circuits being respectively connected to said test wipers, means connected to each incoming line for applying a predetermined electrical characteristic to the test conductor of said incoming line when said incoming line is calling, means independent of said wipers connected to all of the test conductors of said incoming lines and to said driving means for initiating the operation of said driving means when said predetermined electrical characteristic appears on the test conductor of any line, a connecting circuit having a test conductor and a pair of talking conductors, said conductor being normally connected to one set of wipers, relay means for selectively connecting the conductors of said connecting circuit to other of said sets of wipers, discriminating means including portions of said stop means and comprising switch means responsive to the operation of said stop means for opening the branch circuit connected to the test wiper normally connected to said connecting circuit and check means for determining the presence or absence of said electrical characteristic on the branch circuits not opened, and means responsive to said check means for operating said relay means for shifting the connecting circuit from the set of wipers normally connected thereto to another set of wipers.

5. In an automatic telecommunication exchange system, in combination, a plurality of incoming lines, a group of terminals connected to said lines, said group being subdivided into a plurality of sets of terminals, a finder switch comprising a plurality of wipers each adapted to scan successively the terminals of a respective one of said sets, a connecting circuit, relay means adapted selectively to connect said connecting circuit to different ones of said wipers, drive means common to all of said wipers for simultaneously effecting their traverse of the associated terminals, stop means connected to said wipers and responsive to a characteristic D.-C. potential on one of said lines for arresting said drive means upon one of said wipers encountering a terminal connected to a calling subscriber, and discriminator means connected to said wipers and responsive to said characteristic D.-C. potential for operating said relay means, in dependnce upon the wiper to which said potential is applied, to establish a connection only between the last-mentioned wiper and said connecting circuit.

6. In an automatic telecommunication exchange system, in combination, a plurality of incoming lines, said lines having test leads arranged in a plurality of groups, a finder switch comprising a plurality of connector means, one for each of said groups, adapted to hunt among the test leads of the respective group for a line having a characteristic D.-C. potential applied to its test lead from a calling subscriber, a connecting circuit, switch-over means adapted selectively to connect said connecting circuit to different ones of said connector means, actuating means common to all of said connector means for effecting simultaneous hunting thereof among the associated test leads, stop means connected to said connector means and responsive to said characteristic D.-C. potential on one of said test leads for inactivating said actuating means upon one of said connector means encountering a line connected to a calling subscriber, and discriminator means connected to said connector means and responsive to said characteristic D.-C. potential for selectively operating said switch-over means, in dependence upon which one of said connector means has encountered a test lead having said potential, to establish a connection only between said one of said connector means and said connecting circuit.

7. In an automatic telecommunication system, in combination, a plurality of incoming lines, terminals connected to said lines, said terminals being arranged in a first and a second group, a finder switch comprising a first and a second wiper each adapted to scan successively the terminals of said first and said second group, respectively, a connecting circuit, relay means adapted selectively to connect said connecting circuit to either of said wipers, drive means common to said wipers for simultaneously effecting their traverse of the associated terminals, stop means responsive to a characteristic electrical condition on one of said lines for arresting said drive means upon one of said wipers encountering a terminal connectced to a calling subscriber, and discriminator means connected to said wipers and responsive to said characteristic electrical condition for operating said relay means, in dependence upon the wiper to which said potential is applied, to establish a connection between the last mentioned wiper and said connecting circuit to the exclusion of the other wiper, said discriminator means comprising check means normally connected to both of said wipers, said check means being responsive to said characteristic electrical condition, and switch means responsive to operation of said stop means for disconnecting said first wiper from said check means and thereupon placing said relay under the control of said check means, said check means being adapted to control said relay in a sense causing selection of said first wiper in the absence of said electrical condition but causing selection of said second wiper in response to said electrical condition.

8. The combination according to claim 7 wherein said relay is provided with switch-over contacts normally extending said connector circuit toward said first wiper but extending said connector circuit towards said second wiper upon control of said relay by said check means in response to said characteristic electrical condition, said check means being normally connected to said first wiper by way of said switch-over contacts.

References Cited in the file of this patent

UNITED STATES PATENTS

| | | |
|---|---|---|
| 1,337,309 | Goodrum | Apr. 20, 1920 |
| 1,857,833 | Baker et al. | May 10, 1932 |
| 2,115,320 | Saunders | Apr. 26, 1938 |
| 2,171,661 | Mahoney et al. | Sept. 5, 1939 |
| 2,171,669 | Ostline | Sept. 5, 1939 |
| 2,224,692 | Pearce | Dec. 10, 1940 |
| 2,289,896 | Bakker | July 14, 1942 |
| 2,295,032 | Deakin | Sept. 8, 1942 |
| 2,424,281 | McClew | July 22, 1947 |
| 2,513,949 | Long | July 4, 1950 |
| 2,548,673 | Long | Apr. 10, 1951 |